(12) United States Patent
Sim et al.

(10) Patent No.: US 9,070,908 B2
(45) Date of Patent: Jun. 30, 2015

(54) BATTERY SYSTEM, CONTROLLING METHOD OF THE SAME, AND ENERGY STORAGE SYSTEM INCLUDING THE BATTERY SYSTEM

(75) Inventors: Se-Sub Sim, Yongin-si (KR); Eui-Jeong Hwang, Yongin-si (KR); Susumu Segawa, Yongin-si (KR); Jong-Woon Yang, Yongin-si (KR); Han-Seok Yun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 952 days.

(21) Appl. No.: 13/239,185

(22) Filed: Sep. 21, 2011

(65) Prior Publication Data

US 2012/0228946 A1 Sep. 13, 2012

Related U.S. Application Data

(60) Provisional application No. 61/452,048, filed on Mar. 11, 2011.

(51) Int. Cl.
| H01M 2/10 | (2006.01) |
| H01M 2/02 | (2006.01) |
| H01M 10/42 | (2006.01) |
| H01M 10/48 | (2006.01) |
| H02J 3/32 | (2006.01) |

(52) U.S. Cl.
CPC .......... *H01M 2/024* (2013.01); *H01M 10/4207* (2013.01); *H01M 10/482* (2013.01); *H01M 2220/10* (2013.01); *H02J 3/32* (2013.01)

(58) Field of Classification Search
CPC .................................................. H01M 2220/10

USPC ............................................. 429/99; 307/150
See application file for complete search history.

(56) References Cited

U.S. PATENT DOCUMENTS

| 5,600,566 A * | 2/1997 | Park ................................ 702/63 |
| 6,442,494 B1 * | 8/2002 | Baalu et al. ..................... 702/63 |
| 7,227,278 B2 * | 6/2007 | Realmuto et al. ............... 307/44 |
| 7,737,580 B2 * | 6/2010 | Hjort et al. ...................... 307/65 |

(Continued)

FOREIGN PATENT DOCUMENTS

| JP | 2001-015090 A | 1/2001 |
| JP | 2002-078214 A | 3/2002 |
| JP | 2005-243580 A | 9/2005 |

(Continued)

OTHER PUBLICATIONS

KIPO Office action dated Feb. 28, 2014, for corresponding Korean Patent Application No. 10-2012-0011293, (6 pages).

(Continued)

*Primary Examiner* — Fritz M Fleming
(74) *Attorney, Agent, or Firm* — Christie, Parker & Hale LLP

(57) ABSTRACT

A battery system includes a rack having a plurality of battery tray positions, a battery tray in a corresponding battery tray position among the battery tray positions, and a system management unit electrically coupled to the battery tray. Each of the battery tray positions is associated with position information, and the battery tray has an identifier. The system management unit is configured to receive and store the position information and the identifier, and to determine the corresponding battery tray position of the battery tray in accordance with the identifier and the position information.

19 Claims, 13 Drawing Sheets

(56) References Cited

U.S. PATENT DOCUMENTS

| | | | |
|---|---|---|---|
| 7,960,943 B2 * | 6/2011 | Gamboa et al. | 320/107 |
| 2007/0090798 A1 | 4/2007 | Yun et al. | |

FOREIGN PATENT DOCUMENTS

| | | |
|---|---|---|
| JP | 2006-048592 | 2/2006 |
| KR | 10-2004-0095026 A | 11/2004 |
| KR | 10-2005-0047701 A | 5/2005 |
| KR | 10-2007-0043149 | 4/2007 |
| KR | 10-2010-0012660 A | 2/2010 |

OTHER PUBLICATIONS

Machine English Translation of JP 2006-048592.

* cited by examiner

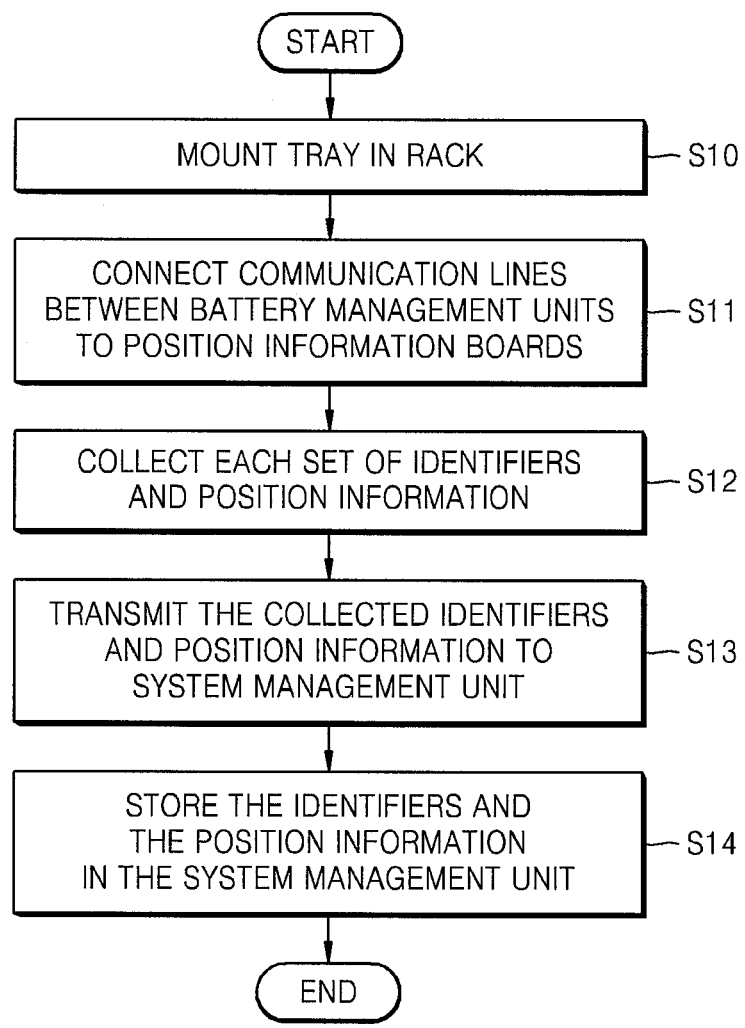

BATTERY SYSTEM, CONTROLLING METHOD OF THE SAME, AND ENERGY STORAGE SYSTEM INCLUDING THE BATTERY SYSTEM

CROSS-REFERENCE TO RELATED APPLICATION

This application claims priority to and the benefit of U.S. Provisional Application No. 61/452,048, filed on Mar. 11, 2011, in the United States Patent and Trademark Office, the disclosure of which is incorporated herein in its entirety by reference.

BACKGROUND

1. Field

Aspects of one or more embodiments of the present invention relate to a battery system, a controlling method of the same, and an energy storage system including the battery system.

2. Description of the Related Art

As environmental problems, such as environmental destruction, resource depletion, etc., have become increasingly serious, interest in a system capable of storing energy and efficiently using the stored energy has increased. In addition, interest in renewable energy, which does not generate pollution or generates only a small amount of pollution in a development process, has also increased. An energy storage system that connects to an existing grid, a renewable energy source, and a battery system that stores power have been researched and developed to cope with today's environmental changes.

Efficient management of a battery is an important factor in the energy storage system. The battery is managed with respect to various parameters such as charging, discharging, cell balancing, etc. When a defect occurs in the battery, the battery may be exchanged for a new one.

SUMMARY

Aspects of one or more embodiments of the present invention are directed toward a battery system capable of easily identifying a position of a tray or a battery tray in which a defect occurs, a controlling method thereof, and an energy storage system including the battery system.

According to one or more embodiments of the present invention, a battery system that may be easily managed, a controlling method thereof, and an energy storage system including the battery system are provided.

According to an embodiment, a battery system includes a rack having a plurality of battery tray positions, each of the battery tray positions being associated with position information; a battery tray in a corresponding battery tray position among the battery tray positions, the battery tray having an identifier; and a system management unit electrically coupled to the battery tray, and being configured to receive and store the position information and the identifier, wherein the system management unit is configured to determine the corresponding battery tray position of the battery tray in accordance with the identifier and the position information.

The battery system may further include a plurality of position information boards respectively corresponding to the plurality of battery tray positions, each of the position information boards being configured to provide the position information of a corresponding one of the battery tray positions.

The battery system may further include one or more other battery trays, wherein the battery tray and the other battery trays are respectively and electrically coupled to the plurality of position information boards, and wherein each of the other battery trays has an identifier.

The system management unit may be configured to receive the identifier and the position information corresponding to each of the battery trays via separate data lines respectively coupled between the battery trays and the system management unit.

Each of the battery trays may be configured to receive the position information from a corresponding one of the position information boards, and to communicate the identifier and the received position information to the system management unit.

The system management unit may be configured to receive the identifier and the position information corresponding to each of the battery trays via separate data lines respectively coupled between the position information boards and the system management unit.

Each of the position information boards may be configured to receive the identifier from a corresponding one of the battery trays, and to communicate the received identifier and the position information to the system management unit.

The system management unit may be configured to receive the identifier and the position information corresponding to each of the battery trays via a data line coupled between a corresponding one of the battery trays and the system management unit.

The corresponding one of the battery trays may be configured to receive the identifier and the position information from each of the other battery trays, and to communicate the received identifier and the received position information to the system management unit.

The battery trays may be grouped into a first group and a second group, and the system management unit may be configured to receive the identifier and the position information corresponding to each of the battery trays in the first group via a first data line coupled between a corresponding one of the battery trays in the first group and the system management unit, and may be configured to receive the identifier and the position information corresponding to each of the battery trays in the second group via a second data line coupled between a corresponding one of the battery trays in the second group and the system management unit.

The corresponding one of the battery trays in the first group may be configured to receive the identifier and the position information from each of the other battery trays in the first group, and to communicate the received identifier and the received position information to the system management unit, and the corresponding one of the battery trays in the second group may be configured to receive the identifier and the position information from each of the other battery trays in the second group, and to communicate the received identifier and the received position information to the system management unit.

The system management unit may be configured to receive the identifier and the position information corresponding to each of the battery trays via a data line coupled between a corresponding one of the position information boards and the system management unit.

The corresponding one of the position information boards may be configured to receive the identifier and the position information from each of the other position information boards, and to communicate the received identifier and the received position information to the system management unit.

The position information boards may be grouped into a first group and a second group, and the system management unit may be configured to receive the identifier and the position information corresponding to each of the battery trays via a first data line coupled between a corresponding one of the position information boards in the first group and the system management unit, and may be configured to receive the identifier and the position information corresponding to each of the battery trays via a second data line coupled between a corresponding one of the position information boards in the second group and the system management unit.

The corresponding one of the position information boards in the first group may be configured to receive the identifier and the position information from each of the other position information boards in the first group, and to communicate the received identifier and the received position information to the system management unit, and the corresponding one of the position information boards in the second group may be configured to receive the identifier and the position information from each of the other position information boards in the second group, and to communicate the received identifier and the received position information to the system management unit.

According to an embodiment of the present invention, an energy storage system includes a power conversion system configured to be coupled to a power generation system and a power grid; and a battery system as described above coupled to the power conversion system, the power conversion system including an integrated controller and being configured to supply power from the battery system, the power generation system, or the power grid to a load. The integrated controller is configured to receive the position information and the identifier from the system management unit, and to determine the corresponding battery tray position of the battery tray in accordance with the identifier and the position information.

According to an embodiment of the present invention, a method of controlling a battery system including a rack that has a plurality of battery tray positions is provided. The method includes determining position information of a battery tray in one of the battery tray positions; and communicating data to a system management unit, the data including the position information and an identifier stored at the battery tray; storing the position information and the identifier at the system management unit; and detecting the battery tray position where the battery tray is located from among the plurality of battery tray positions based on the position information and the identifier stored at the system management unit.

The determining of the position information may include generating the position information from position information board associated with the one of the battery tray positions.

The battery tray may include a battery, and the method may further include monitoring the battery, transmitting a monitoring result of the battery to the system management unit, determining whether or not the battery tray is defective based on the monitoring result, and extracting the position information and the identifier of the battery tray from the data to determine the battery tray position of the battery tray determined to be defective.

According to an embodiment of the present invention, a battery system includes a battery management system (BMS) and a plurality of sub-battery systems electrically coupled to the BMS. Each of the sub-battery systems includes a rack having a plurality of battery tray positions, each of the battery tray positions being associated with position information; a battery tray in a corresponding battery tray position among the battery tray positions, the battery tray having an identifier; and a system management unit electrically coupled with the battery tray, and being configured to receive and store the position information and the identifier. The BMS is configured to receive sets of data respectively from the sub-battery systems, and each of the sets of data includes the identifier and the position information of the battery tray of a corresponding one of the sub-battery systems, and the BMS and/or the system management unit is configured to determine the corresponding battery tray position of the battery tray in accordance with the identifier and the position information.

Each of the sets of data may further include rack information indicating a position of the rack of a corresponding one of the sub-battery systems.

BRIEF DESCRIPTION OF THE DRAWINGS

FIG. 8 is a flowchart illustrating a method of controlling a battery system according to an embodiment of the present invention;

DETAILED DESCRIPTION

Figure 1:
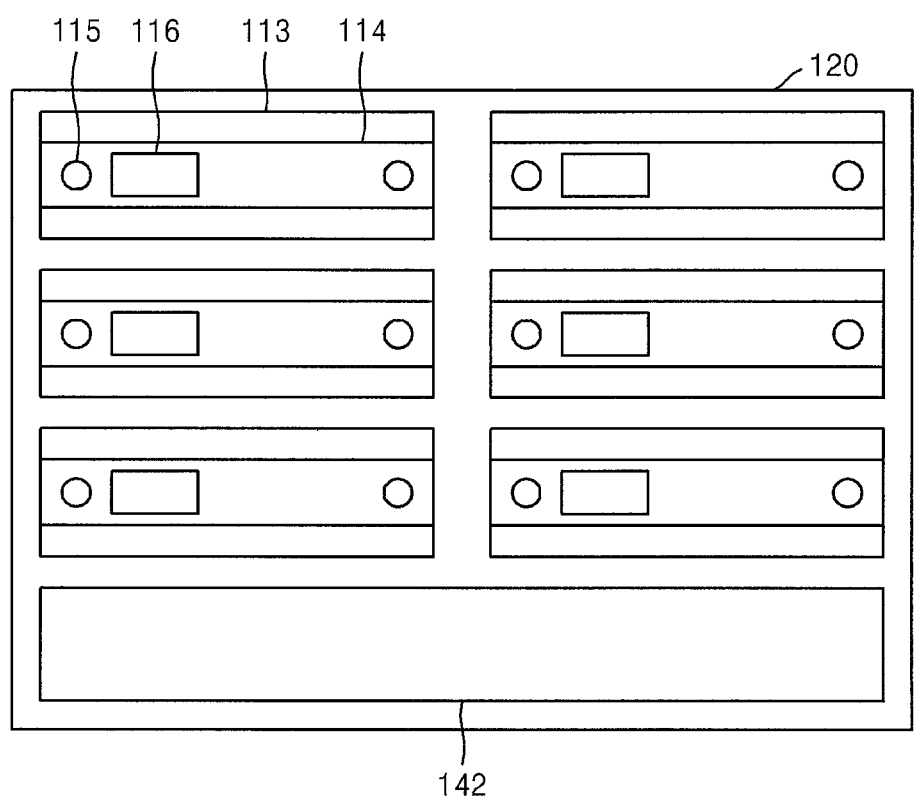
FIG. 1 is a rear view of a rack according to an embodiment of the present invention.

While exemplary embodiments of the present invention are capable of various modifications and alternative forms, embodiments thereof are shown by way of example in the drawings and will herein be described in detail. It should be understood, however, that there is no intent to limit exemplary embodiments to the forms disclosed, but on the contrary, exemplary embodiments are to cover all modifications, equivalents, and alternatives falling within the scope of the present invention. When it is determined that detailed descriptions of the related known art may obscure the scope of the present invention, the detailed descriptions may be omitted.

Hereinafter, exemplary embodiments of the present invention will now be described more fully with reference to the accompanying drawings, in which exemplary embodiments of the present invention are shown. Like or corresponding reference numerals in the drawings denote like elements, and thus their descriptions may be omitted.

FIG. 1 is a rear view of a rack 120 according to an embodiment of the present invention.

Referring to FIG. 1, the rack 120 may include one or more first insertion holes (or openings) 113 into which trays 110-1 through 110-n can be inserted and a second insertion hole (or opening) 142 into which a system management unit 140 can be inserted. A support member 114 may be formed in a rear surface of each of the first insertion holes 113, and may include a first output hole 115 and a second output hole 116. Hereinafter, any one tray is denoted by reference numeral 110, and a battery and a battery management unit included in the tray 110 are denoted by reference numerals 111 and 112, respectively.

A power output terminal that is formed in the tray 110 may be externally exposed through the first output hole 115. The battery management unit 112 that is formed in the tray 110 may be externally exposed through the second output hole 115. However, this is exemplary, and the present invention is not limited thereto. For example, the power output terminal or the battery management unit 112 of the tray 110 may be exposed to a rear surface of the rack 120 without using the support member 114.

Figure 2:
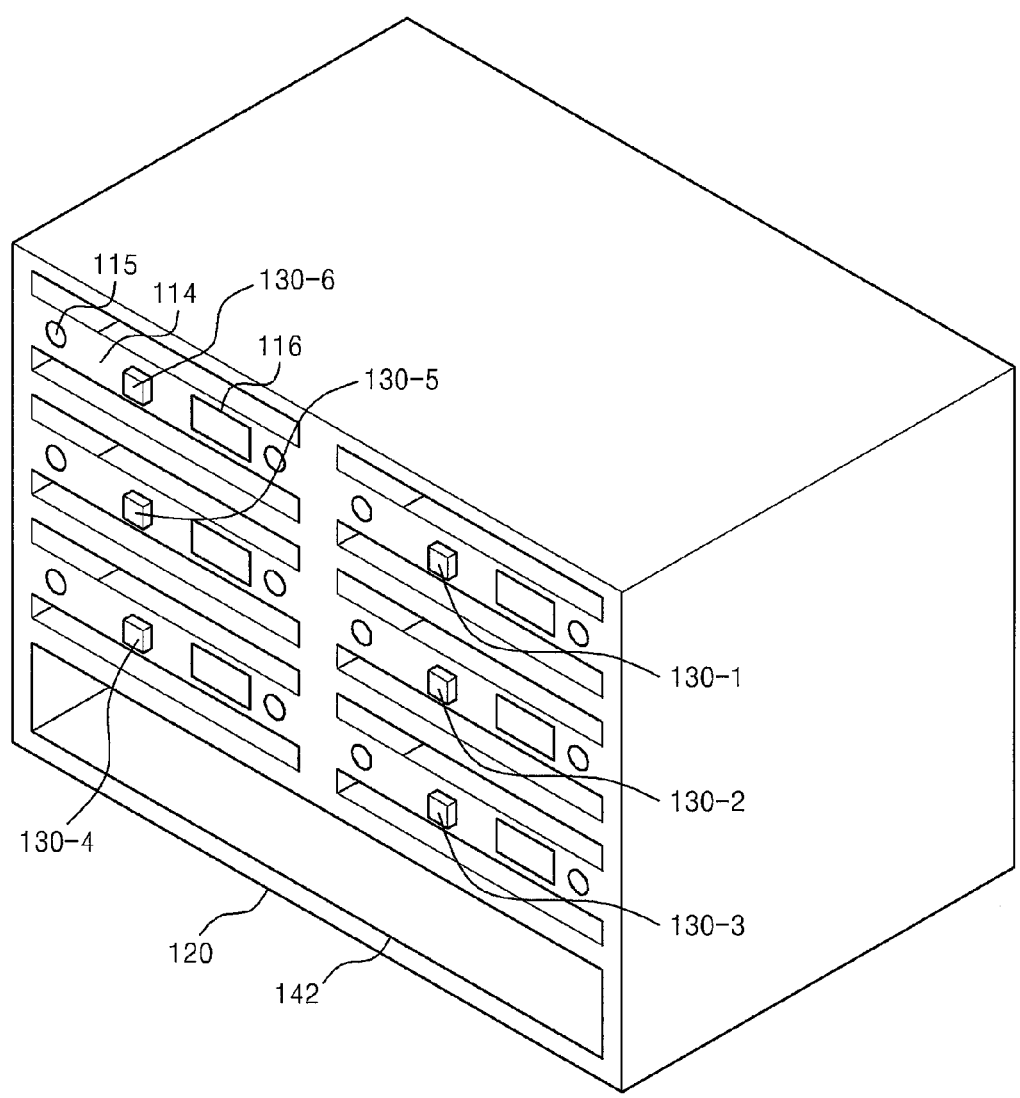
FIG. 2 is a perspective view of a rack according to an embodiment of the present invention.

FIG. 2 is a perspective view of the rack 120 according to an embodiment of the present invention.

Referring to FIG. 2, as described with reference to FIG. 1, the support member 114 may be formed in the rear surface of the rack 120 with respect to each of the first insertion holes 113, and may include the first output hole 115 and the second output hole 116.

One or more position information boards (PBs) 130-1, ..., 130-n may be formed in the support members 114, respectively. The PBs 130-1, ..., 130-n store information regarding the first insertion holes 113 in which the PBs 130-1, ..., 130-n are located. Functions of the PBs 130-1, ..., 130-n will be described in more detail with reference to FIGS. 4 through 7 below. Hereinafter, any one PB is denoted by reference numeral 130.

Figure 3:
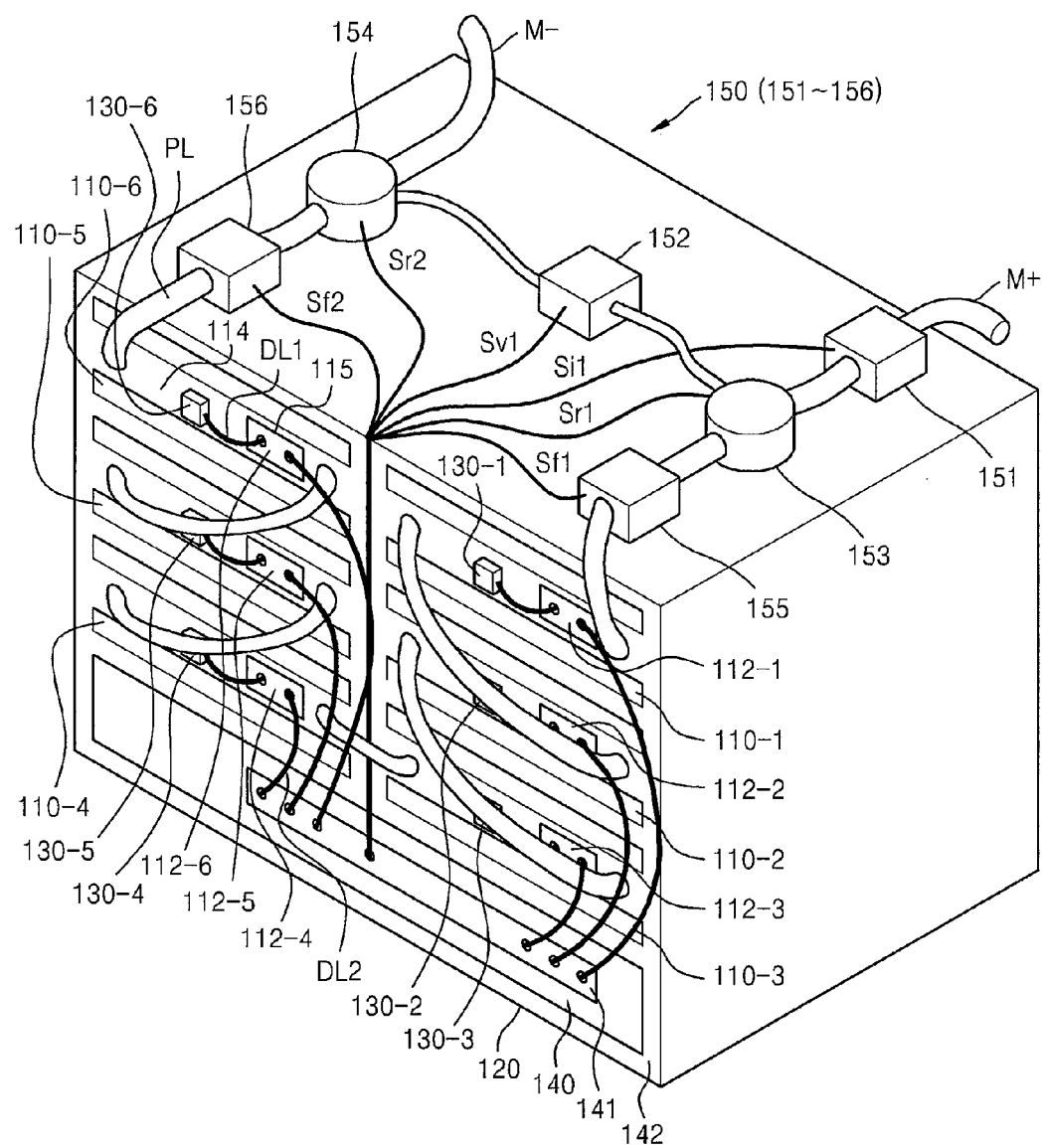
FIG. 3 is a perspective view of a rack in which a tray and a system management unit are mounted according to an embodiment of the present invention.

FIG. 3 is a perspective view of the rack 120 in which the tray 110 and the system management unit 140 are mounted according to an embodiment of the present invention.

Figure 4:
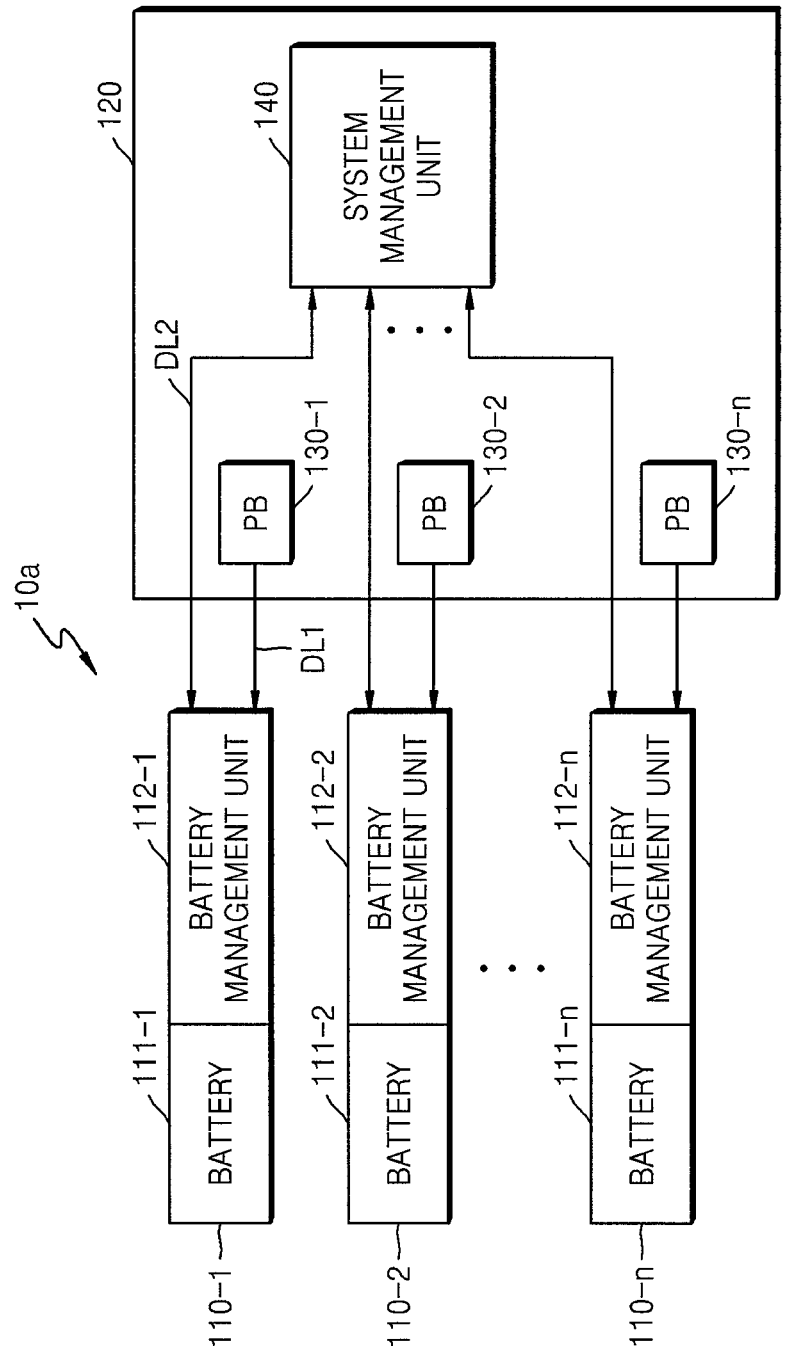
FIG. 4 is a block diagram illustrating a battery system of FIG. 3 according to an embodiment of the present invention.

Referring to FIGS. 3 and 4, a battery system 10a includes the rack 120, the trays 110-1, ..., 110-n, the PBs 130-1, ..., 130-n, the system management unit 140, and a rack protection circuit 150.

The rack 120 includes elements of the battery system 10a.

The trays 110-1, ..., 110-n are mounted in the rack 120 through the first insertion holes 113 formed in the rack 120. If the tray 110 is inserted into the rear surface of the rack 120 through the first insertion hole 113, a power output terminal and the battery management unit 112 that are formed in the tray 110 are externally exposed through the support member 114. The trays 110-1, ..., 110-n may be electrically connected in series and/or in parallel to each other through the battery 111 and a power line (PL) included in the neighboring tray 110. In this regard, a method of connecting the trays 110-1, ..., 110-n in series and/or in parallel to each other may be determined according to a desired voltage that is to be output by the battery system 10a.

The PBs 130-1, ..., 130-n are mounted in the rear surface of the rack 120 respectively corresponding to the first insertion holes 113 as described above. In the present embodiment, when the trays 110-1, ..., 110-n are mounted in the rack 120, the PBs 130-1, ..., 130-n are connected to the battery management unit 112 included in the corresponding tray 110 through a first data line DL1.

The system management unit 140 is mounted in the second insertion hole 142 formed in the rack 120. When the system management unit 140 is inserted into the rear surface of the rack 120 through the second insertion hole 142, a terminal unit 141 included in the system management unit 140 may be externally exposed.

In the present embodiment, battery management units 112-1, ..., 112-n respectively included in the trays 110-1, ..., 110-n are electrically connected to the system management unit 140 through a corresponding second data line DL2.

The system management unit 140 may receive monitoring data from the rack protection circuit 150 and control each element of the rack protection circuit 150 according to the received monitoring data. For example, when the battery system 10a is defective, the system management unit 140 may stop a charging or discharging operation of the battery system 10a.

The rack protection circuit 150 supplies power output from the battery system 10a to an external device. More specifically, the power line PL connected from the first battery tray 110-1 is configured to be connected to a first fuse 155, and outputs power through a first relay 153 and a first current sensor 151 via a first main power line M+. The power line PL connected from the sixth battery tray 110-6 is configured to be connected to a second fuse 156, and to output power through a second relay 154 via a second main power line M−.

The first current sensor 151 and the first voltage sensor 152 respectively measure output current and voltage of the battery system 10a, and transmit signals Si1 and Sv1 corresponding to results of the measurement to the system management unit 140. First and second relay control signals Sr1 and Sr2 received from the system management unit 140 are used to control on and off operations of the first relay 153 and the second relay 154, which allow a current flow through the first main power line M+ and the second main power line M− or block the current flow. The first fuse 155 and the second fuse 156 block high current paths formed in the battery system 10a according to fuse control signals Sf1 and Sf2 received from the system management unit 140.

In the present embodiment, although each element of the rack protection circuit 150 is positioned on an upper end of the rack 120, the present invention is not limited thereto. For example, the rack protection circuit 150 may be formed on a side surface of the rack 120 or in a separate frame. Alternatively, for example, the rack protection circuit 150 may be installed in a space separately prepared in the rack 120, like the tray 110.

Although not shown, the battery system 10a may include a power supply device for supplying power used to operate the battery management unit 112 and the system management unit 140.

FIG. 4 is a block diagram illustrating the battery system 10a of FIG. 3 according to an embodiment of the present invention.

Referring to FIG. 4, the battery system 10a includes the trays 110-1, ..., 110-n, the rack 120, the PBs 130-1, ..., 130-n, and the system management unit 140.

The trays 110-1, ..., 110-n include batteries 111-1, ..., 111-n and battery management units 112-1, ..., 112-n, respectively. One or more of the trays 110-1, ..., 110-n may be mounted in the rack 120 as needed. The tray 110 will now be described below in more detail.

The battery 111 may be charged by an external power source and may supply charged power to a load, etc. The battery 111 may include one or more battery cells. The battery cells may be connected in parallel or in series to each other. The battery cells may each be a chargeable and/or dischargeable secondary battery, such as a nickel-cadmium battery, a lead storage battery, a nickel metal hydride (NiMH) battery, a lithium ion battery, a lithium polymer battery, or the like.

The battery management unit 112 monitors a state of the battery 111, for example, a voltage, a temperature, a charge state, etc., of the battery 111. The battery management unit 112 controls charging and discharging of the battery 111 according to monitoring results. The battery management unit 112 transmits the monitoring results to the system management unit 140.

The battery management unit 112 stores its own identifier used to identify the battery management unit 112 when communicating with an external device, and transmits data including the stored identifier to the external device in order to allow the external device to determine whether or not the data is transmitted from the battery management unit 112.

When the tray 110 is mounted in the rack 120, the battery management unit 112 is electrically connected to the PB 130 located at a position corresponding to where the tray 110 is mounted in the rack 120 through the first data line DL1, and receives position information from the PB 130 through the first data line DL1.

When the tray 110 is mounted in the rack 120, the battery management unit 112 is electrically connected to the system management unit 140 through the second data line DL2 and transmits a set of data, including the identifier stored in the battery management unit 112 and the position information received from the PB 130, to the system management unit 140 through the second data line DL2. That is, the battery management unit 112 collects data including its own identifier and the position information and transmits the collected data to the system management unit 140. In this regard, the battery management unit 112 may transmit its own identifier and the position information to the system management unit 140 when initially connected to the system management unit 140. However, the present invention is not limited thereto, and the battery management unit 112 may transmit its own identifier and the position information to the system management unit 140 whenever communicating with the system management unit 140. For example, the battery management unit 112 may periodically transmit the monitoring results to the system management unit 140, and may transmit its own identifier and the position information to the system management unit 140 whenever transmitting the monitoring results to the system management unit 140.

Each of the PBs 130-1, . . . , 130-n stores position information regarding its own physical position in the rack 120. For example, when the tray 110-1 connected to the first PB 130-1 is mounted at a left top end of the rack 120, data indicating a position of the first PB 130-1 is the position information. Each of the PBs 130-1, . . . , 130-n transmits the position information stored therein to the corresponding tray 110 when connected to the tray 110.

The PBs 130-1, . . . , 130-n are installed in the rack 120. The number of the PBs 130-1, . . . , 130-n is determined in such a way that the PBs 130-1, . . . , 130-n can be connected to the trays 110-1, . . . , 110-n, respectively. Alternatively, the number of the PBs 130-1, . . . , 130-n installed in the rack 120 may be the same as the maximum number of the trays 110-1, . . . , 110-n that can be mounted in the rack 120. For example, when a total of twenty trays are mounted in the rack 120, twenty PBs may be installed in the rack 120 at positions corresponding to the twenty trays, respectively.

Here, the PBs 130-1, . . . , 130-n are used to identify the positions of the trays 110-1, . . . , 110-n. Therefore, the PBs 130-1, . . . , 130-n and the trays 110-1, . . . , 110-n may be connected to each other, respectively.

The system management unit 140 is connected to the trays 110-1, . . . , 110-n and controls the charging and discharging of the batteries 111-1, . . . , 111-n. The system management unit 140 receives a set of data, including identifiers and position information of the trays 110-1, . . . , 110-n, from each of the battery management units 112-1, . . . , 112-n. The system management unit 140 one-to-one matches and stores the received identifiers and position information.

The system management unit 140 receives data regarding monitoring results of the corresponding batteries 111-1, . . . , 111-n from the battery management units 112-1, . . . , 112-n, and determines the tray 110 that is defective from the received data. In this regard, the system management unit 140 extracts identifiers in order to identify the tray 110 or the battery management unit 112 that is defective from the data, and extracts position information that matches the extracted identifiers. The position information extracted by the system management unit 140 includes a physical position of the tray 110 determined to be defective in the rack 120.

Figure 5:
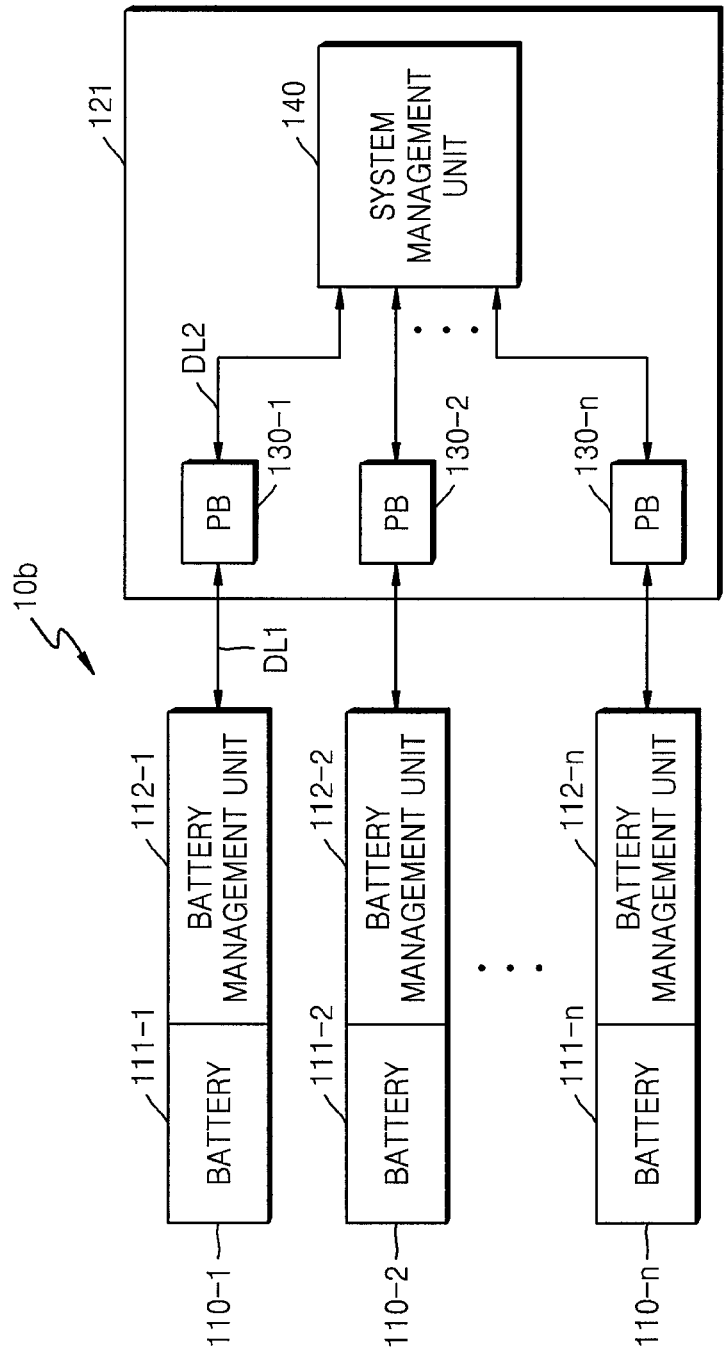
FIG. 5 is a block diagram illustrating a battery system according to another embodiment of the present invention.

FIG. 5 is a block diagram illustrating a battery system 10b according to another embodiment of the present invention. The battery system 10b of the present embodiment is substantially the same as the battery system 10a, which is described with reference to FIG. 4, in terms of construction and function, and thus differences therebetween will now be described.

Referring to FIG. 5, the battery system 10b may include the trays 110-1, . . . , 110-n, the rack 120, the PBs 130-1, . . . , 130-n, and the system management unit 140.

The trays 110-1, . . . , 110-n may include the batteries 111-1, . . . , 111-n and the battery management units 112-1, . . . , 112-n, respectively. In this regard, when the battery management unit 112 according to the present embodiment is electrically connected to the PB 130, the battery management unit 112 transmits its own identifier stored therein to the PB 130 connected thereto through the first data line DL1. Furthermore, the battery management unit 112 transmits data regarding monitoring results of the battery 111 along with its own identifier stored therein to the PB 130 connected thereto.

Each of the PBs 130-1, . . . , 130-n stores position information that is information regarding a physical position thereof installed in the rack 120. When the PBs 130-1, . . . , 130-n are electrically connected to the trays 110, the PBs 130-1, . . . , 130-n each receive an identifier of the corresponding tray 110 from the tray 110 connected thereto.

The PBs 130-1, . . . , 130-n may be electrically connected to the system management unit 140 through the second data line DL2 and transmit a set of data, including the received identifiers and the position information, to the system management unit 140. Furthermore, the PBs 130-1, . . . , 130-n may periodically receive data regarding the monitoring results from the tray 110 connected thereto and transmit the data to the system management unit 140.

The system management unit 140 may be connected to the PBs 130-1, . . . , 130-n and control charging and discharging of the trays 110-1, . . . , 110-n respectively connected to the PBs 130-1, . . . , 130-n. The system management unit 140 receives the set of data, including the received identifiers and the position information, from each of the PBs 130-1, . . . , 130-n. The system management unit 140 one-to-one matches and stores the received identifiers and position information.

Figure 6A:
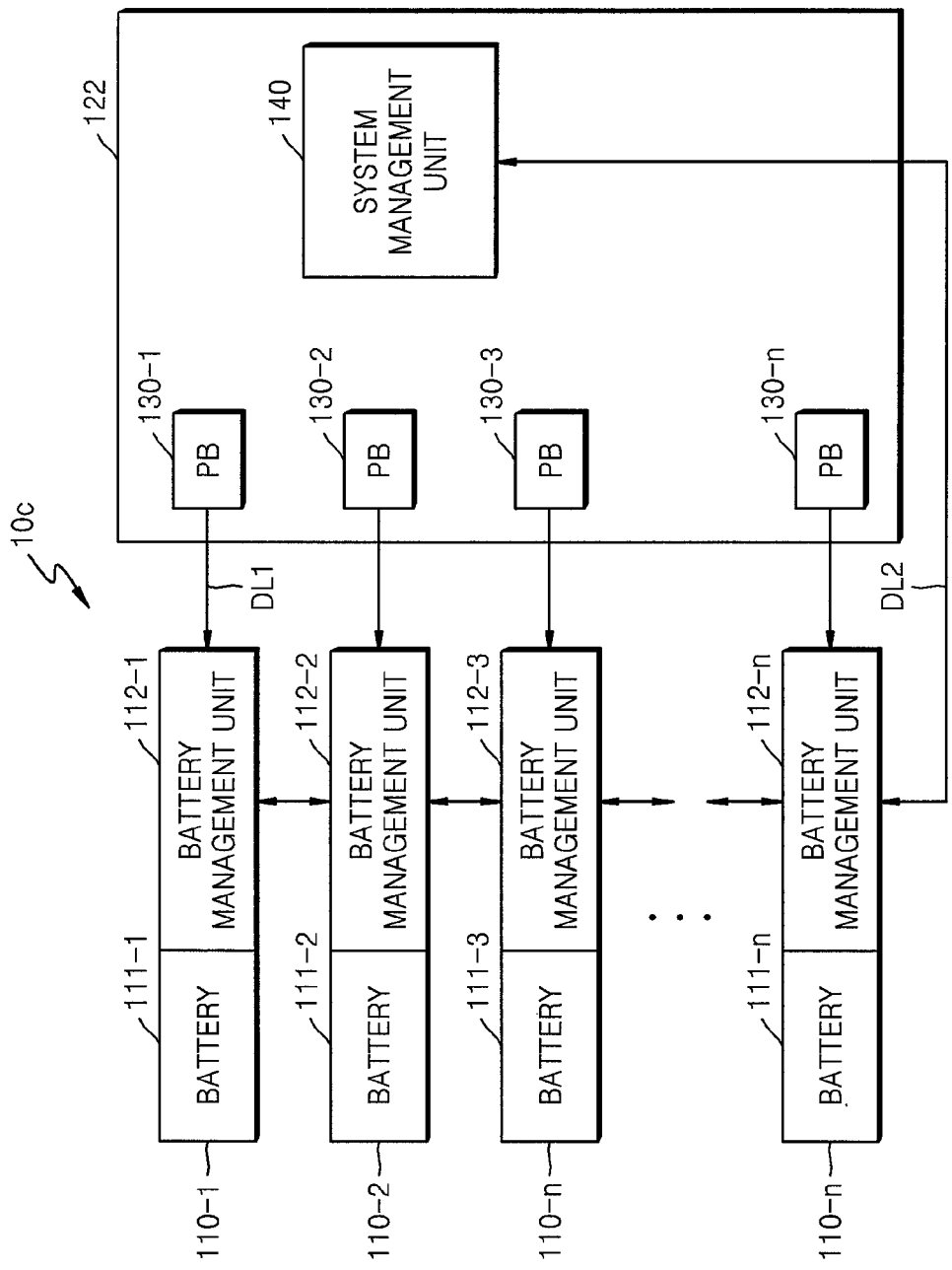
FIG. 6A is a block diagram illustrating a battery system according to another embodiment of the present invention.
Figure 6B:
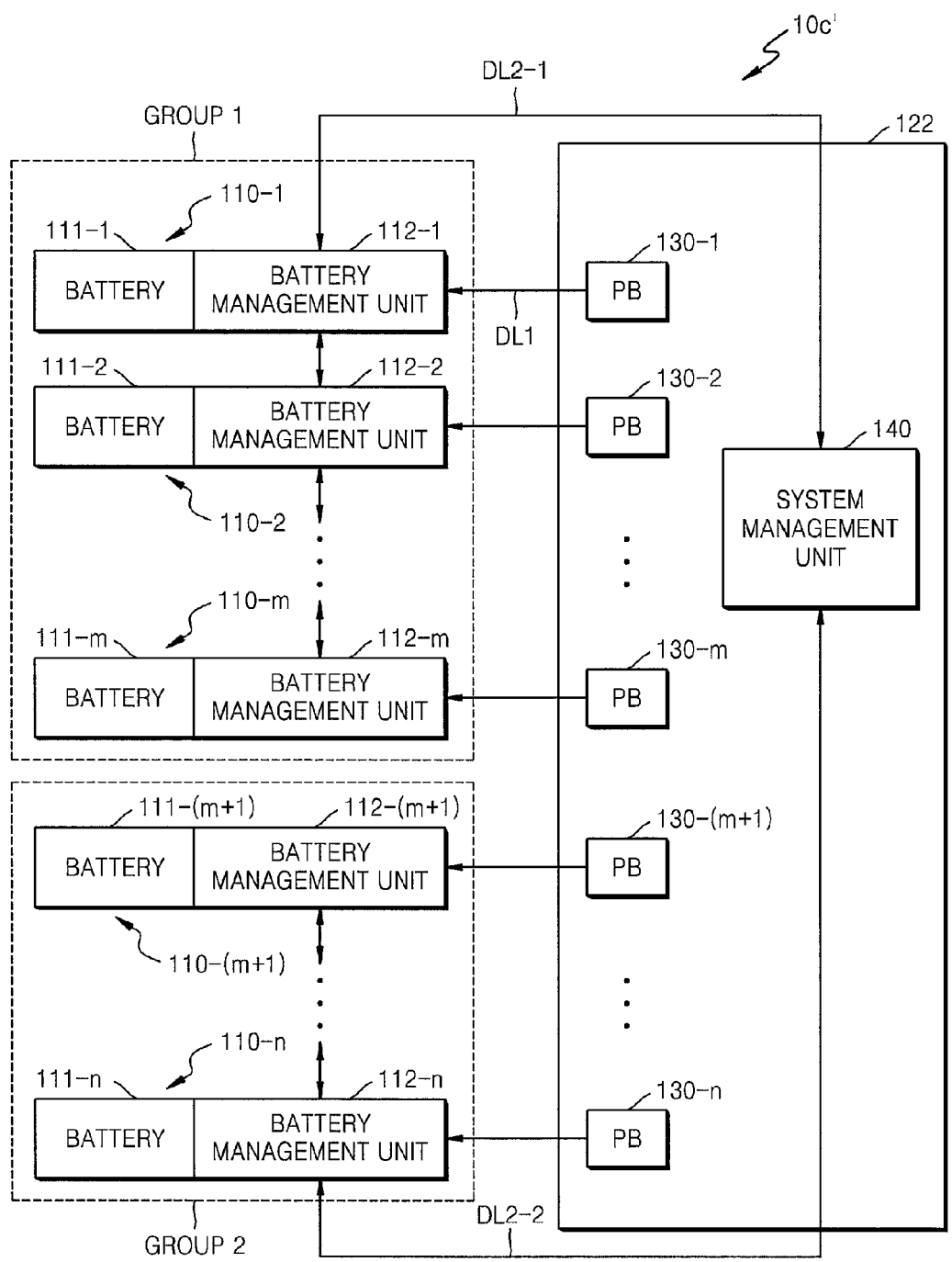
FIG. 6B is a block diagram illustrating a battery system according to another embodiment of the present invention.

FIG. 6A is a block diagram illustrating a battery system 10c according to another embodiment of the present invention. The battery system 10c of the present embodiment is substantially the same as the battery system 10a, which is described with reference to FIG. 1, in terms of construction and function, and thus only differences therebetween will now be described.

Referring to FIG. 6A, the battery system 10c may include the trays 110-1, ..., 110-n, the rack 120, the PBs 130-1, ..., 130-n, and the system management unit 140.

One of the battery management units 112, according to the present embodiment, receives position information from the PB 130 connected thereto and transmits a set of data, including the received position information and its own identifier stored therein, to other battery management units 112. For example, the battery management unit 112-1 transmits a set of data including its own identifier and the received position information to the battery management unit 112-2. The battery management unit 112-2 transmits the set of data received from the battery management unit 112-1 and a set of collected data to the battery management unit 112-3. The battery management unit 112-n finally transmits the sets of data received from the battery management units 112-1, ..., 112-(n−1) and a set of collected data to the system management unit 140.

Although the battery management unit 112-n positioned at the end collects all sets of data and transmits the collected sets of data to the system management unit 140 in the present embodiment, the present invention is not limited thereto. For example, in the battery system 10c' shown in FIG. 6B, half of the battery management units (e.g., Group 1 including 112-1, ..., 112-m) may transmit the sets of data to the management unit 112-1, the remaining half thereof (e.g., Group 2 including 112-(m+1), ..., 112-n) may transmit the sets of data to the battery management unit 112-n, and the battery management units 112-1 and 112-n may transmit the sets of collected data to the system management unit 140 via DL2-1 and DL2-2, respectively. Alternatively, one of the battery management units 112-1, ..., 112-n disposed in the middle thereof may collect the sets of data through a path sequentially transmitted from the battery management unit 112-1 and through a path sequentially transmitted from the battery management unit 112-n.

Figure 7A:
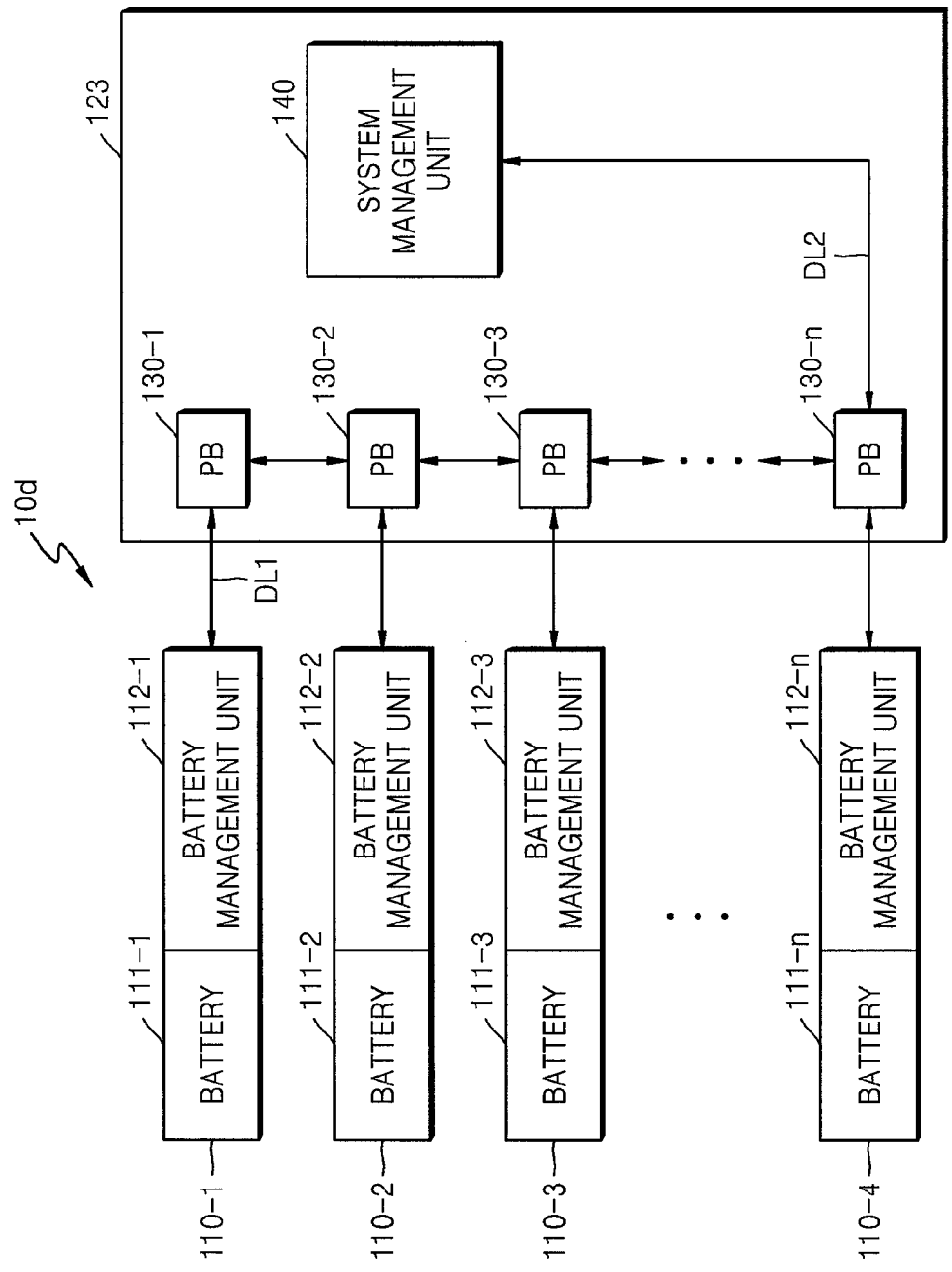
FIG. 7A is a block diagram illustrating a battery system according to another embodiment of the present invention.

FIG. 7A is a block diagram illustrating a battery system 10d according to another embodiment of the present invention. Referring to FIG. 7A, the battery system 10d may include the trays 110-1, ..., 110-n, the rack 120, the PBs 130-1, ..., 130-n, and the system management unit 140.

In the present embodiment, the PBs 130-1, ..., 130-n each collect a set of data including the identifier of a corresponding tray 110 and position information and sets of data including identifiers and position information from other PBs, and transmit the collected sets of data. One of the PBs 130-1, ..., 130-n collects all the sets of data and transmits the collected sets of data to the system management unit 140.

The battery system 10d of the present embodiment is substantially the same as the battery systems 10b and 10c, which are described with reference to FIGS. 5 and 6, in terms of construction and function, and thus the detailed description thereof will be omitted here.

In the related art, the plurality of trays 110-1, ..., 110-n may be installed in the rack 120. If one tray 110 of the trays 110-1, ..., 110-n was defective, it was not easy to discover the tray 110 that was defective since the system management unit 140 had no means or method to identify a physical position of the tray 110 that was defective.

However, as described above, the battery systems 10a through 10d according to the embodiments of the present invention can easily identify the position of the tray 110 that is determined to be defective in the rack 120 according to position information, thereby facilitating easy management, like exchanging or repairing the tray 110 that is defective.

Figure 7B:
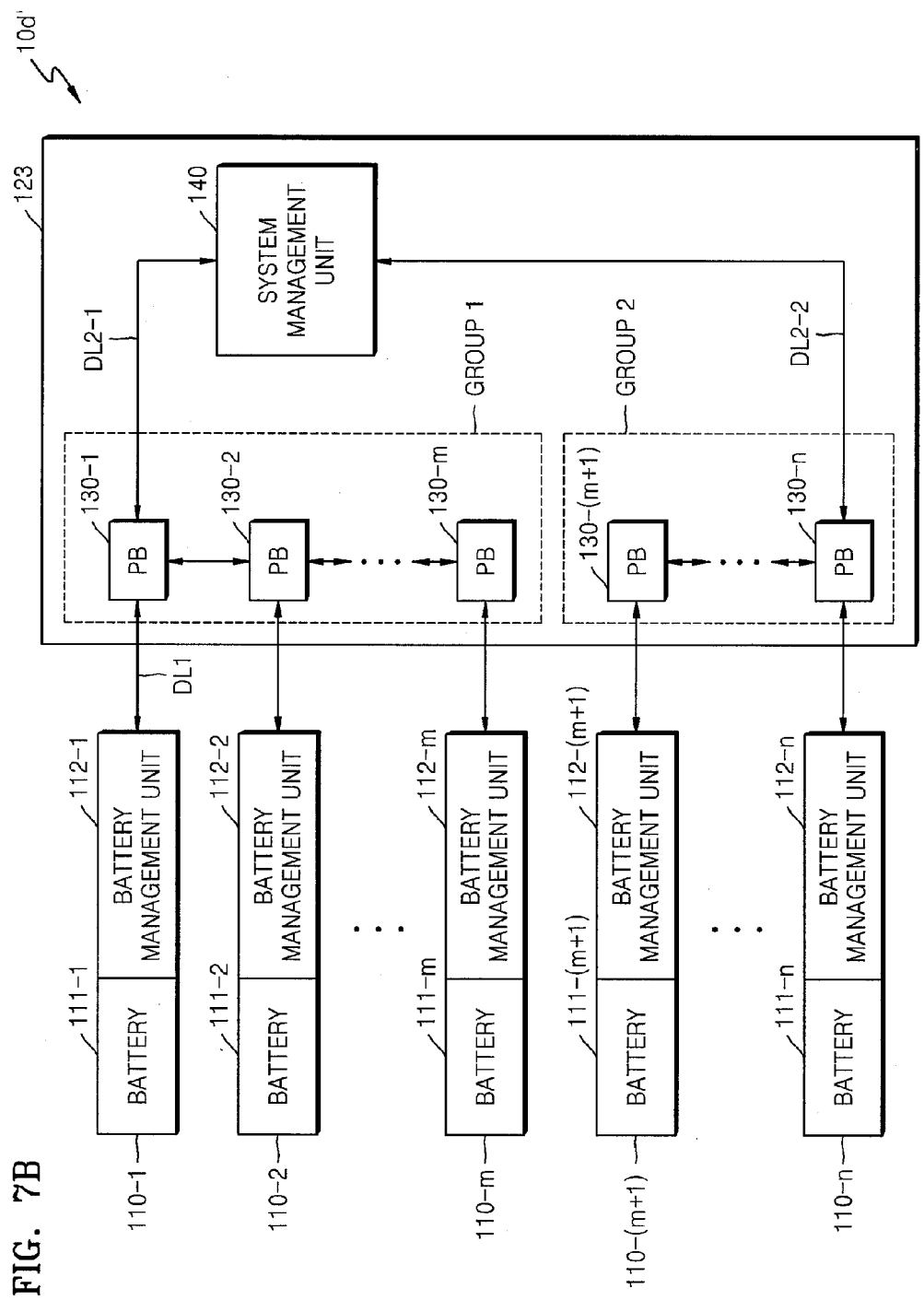
FIG. 7B is a block diagram illustrating a battery system according to another embodiment of the present invention.

FIG. 7B is a block diagram illustrating a battery system 10d' according to another embodiment of the present invention. The battery system 10d' is substantially the same as the battery system 10d of FIG. 7A. Therefore, only their differences will be described.

In the battery system 10d', the PBs 130-1, ..., 130-m are included in Group 1, and the PBs 130-(m+1), ..., 130-n are included in Group 1. The PB 130-1 collects the identifier of the tray 110-1 and its position information and sets of data including the identifiers and position information from the PBs 130-2, ..., 130-m, and transmits the collected sets of data to the system management unit 140 via a data line DL2-1. The PB 130-n collects the identifier of the tray 110-n and its position information and sets of data including the identifiers and position information from the PBs 130-(m+1), ..., 130-(n−1), and transmits the collected sets of data to the system management unit 140 via a data line DL2-2.

FIG. 8 is a flowchart illustrating a method of controlling the battery systems 10a through 10d' according to an embodiment of the present invention.

Referring to FIG. 8, the trays 110-1, ..., 110-n are mounted in the rack 120 (operation S10). In this regard, the battery management units 112-1, ..., 112-n are connected to the corresponding PB 130 through the first data line DL1 as a communication line to allow communication of data therebetween (operation S11).

When the communication lines are formed between the battery management units 112-1, ..., 112-n and the PBs 130-1, ..., 130-n, each set including the battery management unit 112 and the PB 130 collects identifiers and position information (operation S12). In this regard, the battery management unit 112 may collect the position information, or alternately, the PB 130 may collect the identifiers.

The collected identifiers and position information are included in sets of data and transmitted to the system management unit 140 (operation S13). The system management unit 140 stores the received sets of data (operation S14). In this regard, the system management unit 140 matches the sets of identifiers and position information.

Figure 9:
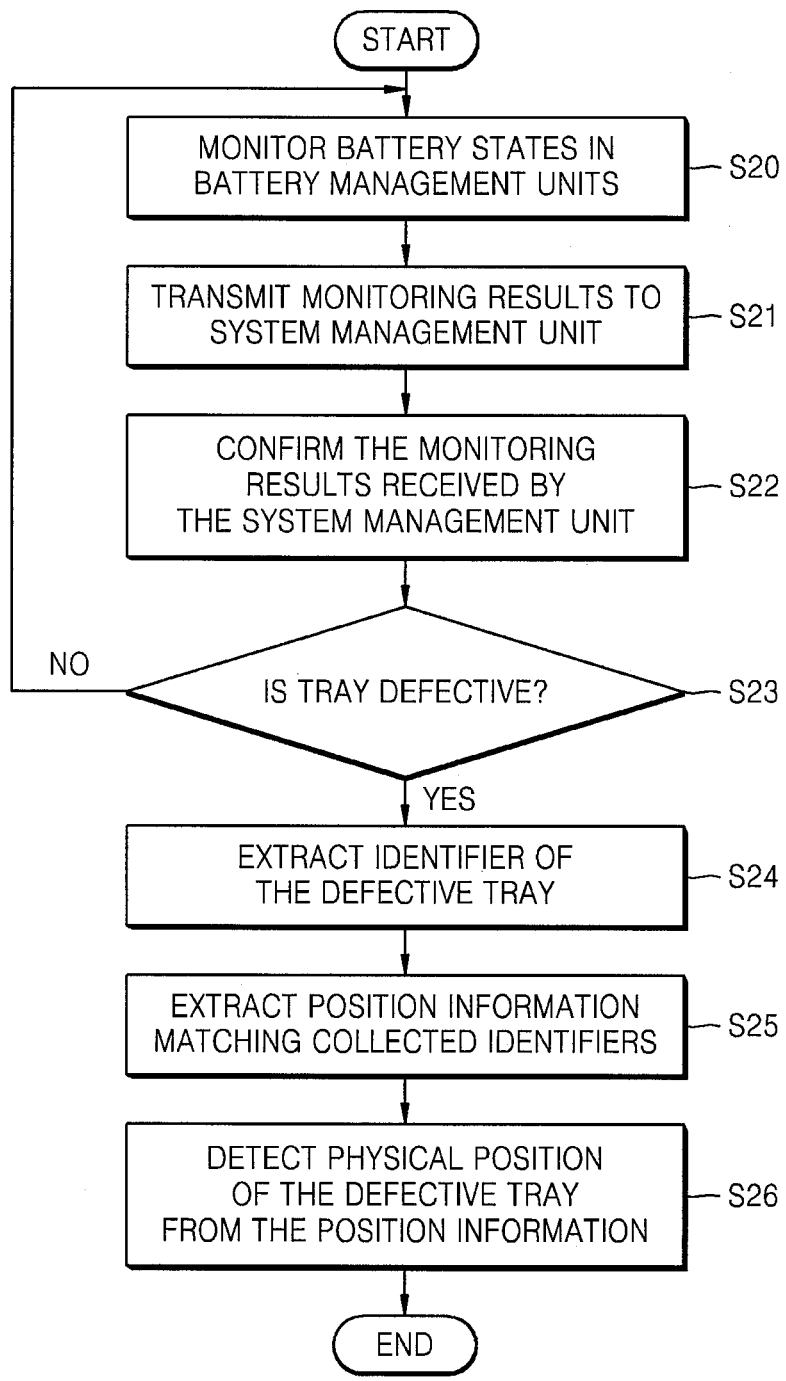
FIG. 9 is a flowchart illustrating a method of controlling a battery system according to another embodiment of the present invention.

FIG. 9 is a flowchart illustrating a method of controlling the battery systems 10a through 10d' according to another embodiment of the present invention.

Referring to FIG. 9, the battery management units 112-1, ..., 112-n monitor states of the corresponding batteries 111-1, ..., 111-n (operation S20), and transmit data regarding monitoring results to the system management unit 140 (operation S21). In this regard, the data may be transmitted from the battery management unit 112 or the PB 130.

The system management unit 140 confirms the received data regarding the monitoring results (operation S22), and determines whether or not any tray 110 of the trays 110-1, ..., 110-n is defective (operation S23).

If the system management unit 140 determines that the tray 110 is not defective, the system management unit 140 performs operation S20 again. If the system management unit 140 determines that the tray 110 is defective, the system management unit 140 extracts identifiers from the data regarding the monitoring results (operation S24). The system management unit 140 extracts position information that matches the extracted identifiers (operation S25) and detects a physical position of the tray 110 that is defective from the extracted position information (operation S26).

As described above, the methods of controlling the battery systems 10a through 10d', according to the embodiments of the present invention, can easily identify the position of the tray 110 that is determined to be defective in the rack 120 according to position information, thereby facilitating easy management, like exchanging or repairing the tray 110 that is defective.

Figure 10:
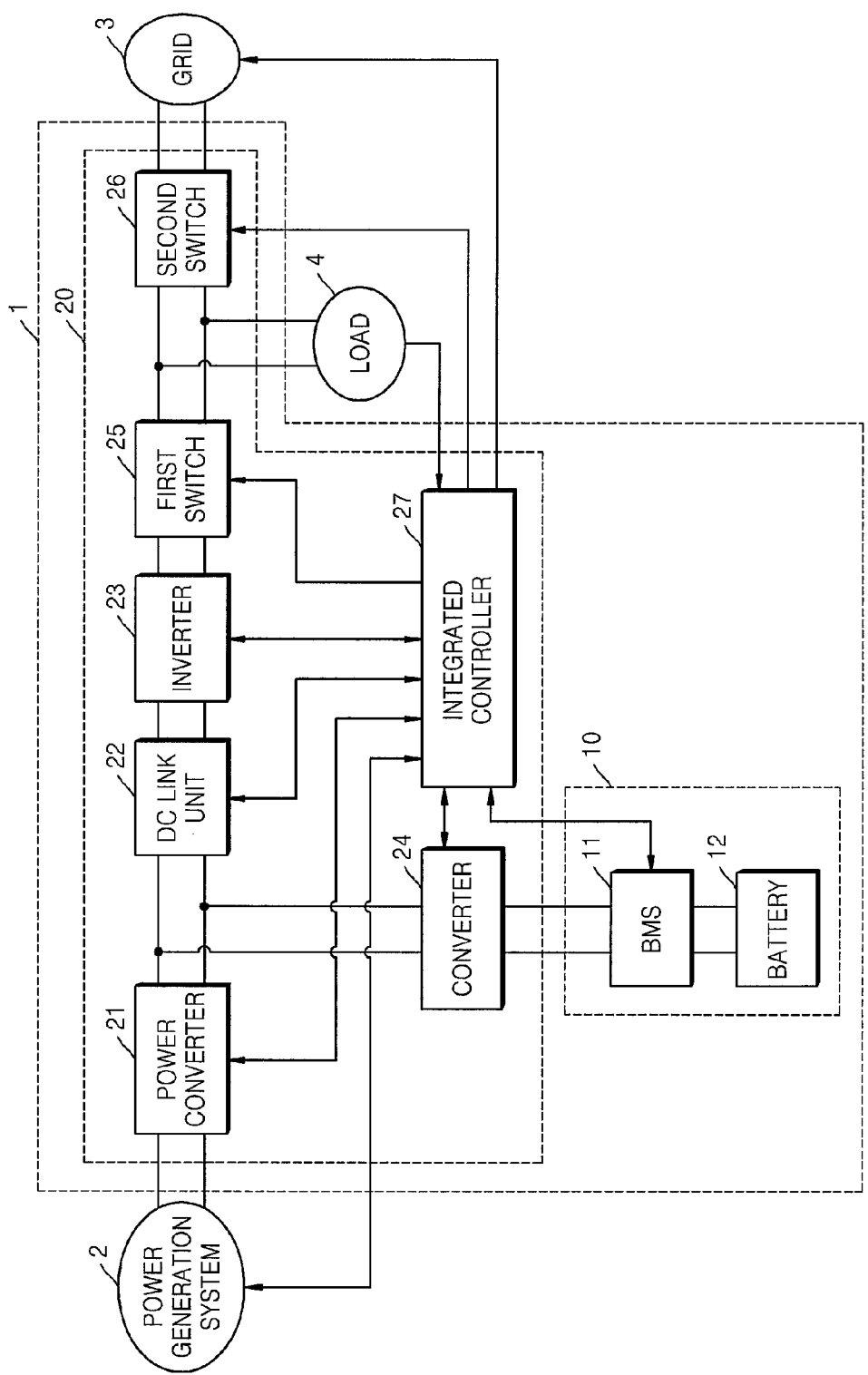
FIG. 10 is a block diagram illustrating an energy storage system according to an embodiment of the present invention.

FIG. 10 is a block diagram illustrating an energy storage system 1 according to an embodiment of the present invention.

Referring to FIG. 10, the energy storage system 1 is electrically connected to a power generation system 2 and a grid 3 in order to supply power to a load 4.

The power generation system 2 generates power by using an energy source. The power generation system 2 supplies the generated power to the energy storage system 1. The power generation system 2 may be a photovoltaic power generation system, a wind power generation system, a tidal power generation system, or the like. However, this is an exemplary embodiment, and thus the power generation system 2 is not limited to the above-mentioned types. The power generation system 2 may include all types of power generation systems that generate power using renewable energy such as solar heat, geothermal heat, or the like. In particular, since a solar cell generates electric energy using sunlight and is easily installed in a home, a factory, or the like, the solar cell is appropriate to be applied to the energy storage system 1 distributed in a home, a factory, or the like. The power generation system 2 may include a plurality of power generation modules arrayed in parallel and generate power via each of the power generation modules to constitute a mass storage energy system.

The grid 3 is a generic term for a power plant, a substation, a power line, or the like. When the grid 3 is in a normal, state, the grid 3 may supply power to the energy storage system 1 in order to supply power to the load 4 and/or a battery 12, and may be supplied with power from the energy storage system 1. When the grid 3 is in an abnormal state, the grid 3 stops supplying or receiving power to or from the energy storage system 1.

The load 4 consumes power generated by the power generation system 2, power stored in the battery 12, or power supplied from the grid 3. The load may be an electric/electronic device or the like in a home or a factory.

The energy storage system 1 stores power generated by the power generation system 2 in the battery 12 and supplies the generated power to the grid 3. The energy storage system 1 supplies power stored in the battery 12 to the grid 3 or stores power supplied from the grid 3 in the battery 12. When the grid 3 is in the abnormal state, e.g., a power failure occurs, the energy storage system 1 performs an uninterruptible power supply (UPS) operation to supply power to the load 4. Even when the grid 3 is in the normal state, the energy storage system 1 supplies the power generated by the power generation system 2 or the power stored in the battery 12 to the load 4.

The energy storage system 1 includes a power conversion system (PCS) 20 that controls power conversion and a battery system 10.

The PCS 20 converts powers from the power generation system 2, the grid 3, and the battery 12 into appropriate power and supplies the converted power to a place that demands the power. The PCS 20 includes a power converter 21, a direct current (DC) link unit 22, an inverter 23, a converter 24, a first switch 25, a second switch 26, and an integrated controller 27.

The power converter 21 is connected between the power generation system 2 and the DC linker 22. The power converter 21 transmits power generated by the power generation system 2 to the DC linker 22. Here, the power converter 21 converts a power voltage into a DC link voltage.

The power converter 21 may be a power conversion circuit, such as a converter, a rectifier circuit, or the like, according to the type of the power generation system 2. When power generated by the power generation system 2 is DC power, the power converter 21 may be a converter that converts the DC voltage into a DC link voltage. When the power generated by the power generation system 2 is alternating current (AC) power, the power converter 21 may be a rectifier circuit that converts the AC voltage into the DC link voltage. When the power generation system 2 is a photovoltaic power generation system, the power converter 21 may include a maximum power point tracking (MPPT) converter that controls MPPT to maximize the amount of power generated by the power generation system 2 according to changes in insolation, temperature, or the like. When the power generation system 2 does not generate power, the power converter 21 stops its operation so that the converter, the rectifier circuit, or the like consumes a minimal or reduced amount of power.

When the plurality of power generation modules included in the power generation system 2 are connected in parallel to each other, the plurality of power generation modules may be connected to a power conversion circuit. When the plurality of power generation modules produce a great amount of power, the power generation system 2 may include a plurality of power conversion circuits used to divide and convert power produced in the plurality of power generation modules. For example, when the power generation system 2 is a solar power generation system, the power generation system 2 may include a plurality of solar cells respectively connected to a plurality of MPPT converters connected in parallel to each other.

A level of the DC link voltage may be unstable due to an instantaneous voltage drop in the power generation system 2 or the grid 3, a peak load occurring in the load 4, or the like. However, the DC link voltage is to be stabilized for normal operations of the converter 24 and the inverter 23. A mass storage capacitor or the like may be used as the DC linker 12 so as to stabilize the DC link voltage. The DC linker 12 is connected between the power converter 21 and the inverter 23 to uniformly maintain the DC link voltage.

The inverter 23 is a power conversion device connected between the DC linker 22 and the first switch 25. The inverter 23 may include an inverter that converts the DC link voltage output from the power generation system 2 and/or the battery 12 into an AC voltage of the grid 3 in a discharge mode and outputs the AC voltage. The inverter 23 may include a rectifier circuit that rectifies the AC voltage of the grid 3, converts the AC voltage into the DC link voltage, and outputs the DC link voltage to store the power of the grid 3 in the battery 12 while in a charge mode.

The inverter 23 may further include a filter for removing harmonic waves from an AC voltage output to the grid 3. The inverter 23 may further include a phase-locked loop (PLL) that synchronizes a phase of an AC voltage output from the inverter 23 with a phase of the AC voltage of the grid 3 to inhibit reactive power from being generated. The inverter 23 performs functions such as a voltage change range restriction function, a power-factor improvement function, a DC component removal function, a transient phenomena protection function, etc. When the inverter 23 is not used, the inverter 23 stops its operation to reduce power consumption.

Here, a great amount of power is supplied from the power generation system 2 or the battery 12, the inverter 23 may include a plurality of inverters to divide the supplied power and convert the divided power into power to be supplied to the grid 3. For example, when the power converter 21 includes a plurality of power conversion circuits, each power conversion circuit may be connected to the plurality of inverters connected in parallel to each other.

The converter 24 is a power conversion device connected between the DC linker 22 and the battery 12. The converter 24 includes a converter that converts a voltage of power stored in the battery 12 into a voltage level demanded by the inverter 23 (i.e., into the DC link voltage) in the discharge mode (i.e., performs DC-DC conversion with respect to the power) and outputs the DC link voltage. The converter 24 includes a converter that converts a voltage of power output from the power converter 21 or a voltage of power output from the inverter 23 into a voltage level demanded by the battery 12 (i.e., into a charge voltage) in the charge mode (i.e., performs DC-DC conversion with respect to the power) and outputs the charge voltage. When charging or discharging of the battery 12 is not performed, the converter 24 stops its operation to lower power consumption.

The first and second switches 25 and 26 are connected in series between the inverter 23 and the grid 3 and perform on/off operations under control of the integrated controller 27 to control a flow of a current between the power generation system 2 and the grid 3. On/off states of the first and second switches 25 and 26 are determined according to states of the power generation system 2, the grid 3, and the battery 12. For example, when the load 4 requires a great amount of power, the first and second switches 25 and 26 are switched on so as to allow both the power of the power generation system 2 and the grid 3 to be used. When the power supplied from the power generation system 2 and the grid 3 does not satisfy the amount of power required by the load 4, the power stored in the battery 12 may also be supplied to the load 4. When a power failure occurs in the grid 3, the second switch 26 is switched off, and the first switch 25 is switched on. Therefore, the power of the power generation system 2 and/or the battery 12 is supplied to the load 4, and the power supplied to the load 4 is prevented from flowing into the grid 3. That is, the energy storage system 1 is prevented from supplying power to the grid 3 in order to prevent a worker operating with electric power lines or the like of the grid 3 from being electrocuted by the power supplied from the energy storage system 1.

The integrated controller 27 monitors states of the power generation system 2, the grid 3, the battery 12, and the load 4, and controls operations of the power converter 21, the inverter 23, the converter 24, the first switch 25, the second switch 26, and a battery management system (BMS) 11 according to monitoring results. The integrated controller 27 monitors whether or not a power failure has occurred in the grid 3, and whether or not power has been generated by the power generation system 2. The integrated controller 27 further monitors an amount of power generated by the power generation system 2, a charge state of the battery 12, an amount of power consumed by the load 4, time, etc.

When a power failure occurs in the grid 3, and the energy storage system 1 functions as a UPS, the integrated controller 27 may have control over the load 4 to supply power to a device having priority among a plurality of devices included in the load 4. For example, when the energy storage system 1 is installed at home, the integrated controller 27 may control the load 4 in order to first supply power to a refrigerator.

The integrated controller 27 may include a communication unit (not shown) for monitoring or controlling the power generation system 2, the grid 3, and the load 4, and communicate various types of data by using the communication unit.

The battery system 10 may include the BMS 11 and the battery 12.

The BMS 11 controls charge and discharge operations of the battery 12 under control of the integrated controller 27.

The BMS 11 performs an overcharge protection function, an overdischarge protection function, an overcurrent protection function, an overvoltage protection function, an overheat protection function, a cell balancing function, etc. To this end, the BMS 11 monitors a voltage, a current, a temperature, a residual amount of power, a lifespan, a charge state, etc., of the battery 12 and transmits the monitoring results to the integrated controller 27.

The battery 12 is supplied with power generated by the power generation system 2 or power of the grid 3, stores the power, and supplies the stored power to the load 4 or the grid 3. The battery 12 may include one or more racks connected in series and/or in parallel. Each of the racks may include one or more battery trays connected in series and/or in parallel. Each of the battery trays may include a plurality of battery cells.

In this regard, the trays 110-1, . . . , 110-n of FIGS. 4 through 7B may be the battery trays, and the system management unit 140 of FIGS. 4 through 7B may be the BMS 11. Thus, the BMS 11 may collect and store identifiers and position information from the battery trays. The BMS 11 may transmit the collected identifiers and position information to the integrated controller 27, and the integrated controller 27 stores the transmitted identifiers and position information.

Here, the number of battery systems 10 may be determined according to a power capacity, design conditions, etc., demanded by the energy storage system 1. For example, when power consumption of the load 4 is large, a plurality of battery systems 10 may be constituted. In this case, the battery systems 10 may further include a master management unit (not shown) for controlling a plurality of BMSs 11, and may store identifiers and position information collected by the master management unit.

The battery system 10 including the BMS 11 and the battery 12 may be one of the battery systems 10a through 10d described with reference to FIGS. 4 through 7B, and thus a detailed description thereof will not be repeated here.

As described above, the energy storage system 1 according to the present embodiment can easily identify a position of a battery tray that is determined to be defective in a rack from among a plurality of battery trays, thereby facilitating easy management, like exchanging or repairing the battery tray that is defective.

Figure 11:
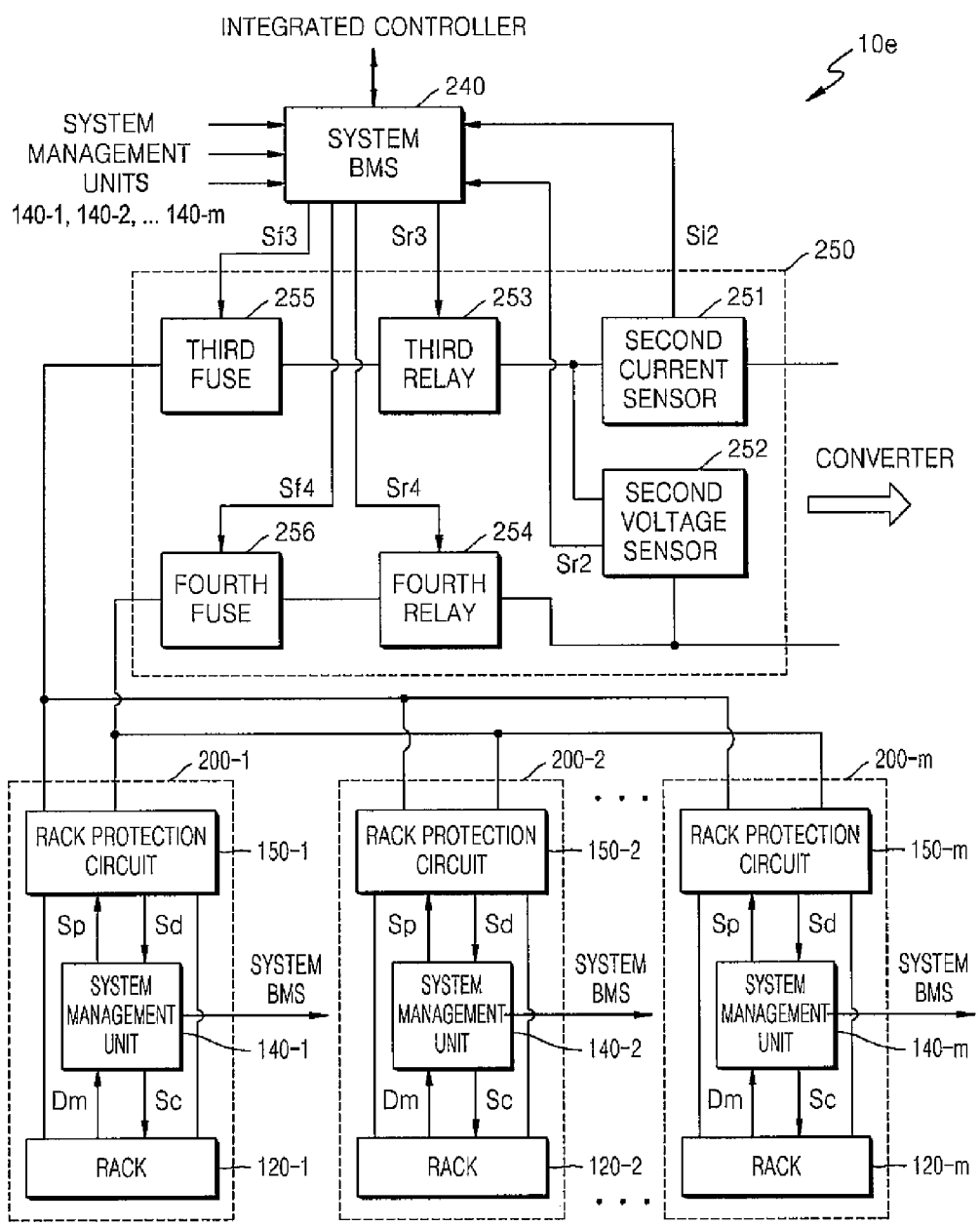
FIG. 11 is a block diagram illustrating a battery system according to another embodiment of the present invention.

FIG. 11 is a block diagram of a battery system 10e according to another embodiment of the present invention.

Referring to FIG. 11, the battery system 10e includes a plurality of sub battery systems 200-1, . . . , 200-m, a system BMS 240, and an integrated protection circuit 250.

The number of the sub battery systems 200-1, . . . , 200-m may be determined in accordance with a power capacity, design condition, etc., required by the energy storage system 1. The operations of the sub battery systems 200-1, . . . , 200-m are substantially the same as those of the battery systems 10a through 10d described with reference to FIGS. 4 through 7, and thus the detailed descriptions thereof will not be repeated here.

The system BMS 240 receives various types of data from the system management units 140-1, . . . , 140-m respectively included in the sub battery systems 200-1, . . . , 200-m, and controls the integrated protection circuit 250 based on the received data. The system BMS 240 may transmit the received data to the integrated controller 27, and receive instructions used to control the sub battery systems 200-1, . . . , 200-m from the integrated controller 27.

The integrated protection circuit 250 may include a second current sensor 251, a second voltage sensor 252, a third relay 253, a fourth relay 254, a third fuse 255, and a fourth fuse 256. The operations of the elements of the integrated protection circuit 250 are substantially the same as those of the rack protection circuit 150 described with reference to FIG. 3, and thus the detailed descriptions thereof will not be repeated here.

In the present embodiment, the system BMS 240 receives sets of data including an identifier of the tray 110 and position information corresponding to the identifier from the system management units 140-1, ..., 140-*m*. In the present embodiment, each of the system management units 140-1, ..., 140-*m* may add rack position information indicating their physical positions to the sets of data and transmits the sets of data to the system BMS 240.

In the related art, the battery system 10*e* may include the plurality of sub battery systems 200-1, ..., 200-*m* and the plurality of trays 110-1, ..., 110-*n* installed in the rack 120 included in each of the plurality of sub battery systems 200-1, ... 200-*m*. If one tray 110 of the of trays 110-1, ..., 110-*n* was defective, it was not easy to discover the tray 110 that was defective since the system management unit 140 had no means or method to identify a physical position of the tray 110 that was defective.

As described above, according to the battery system 10*e* of the present embodiment, the tray 110, that is determined to be defective according to the position information and the rack position information, is positioned in the battery system 200 of the plurality of sub battery systems 200-1, ..., 200-*m*, and the position of the tray 110 can be easily identified, thereby facilitating easy management, like exchanging or repairing the tray 110 that is defective.

While the present invention has been particularly shown and described with reference to exemplary embodiments thereof, it will be understood by those of ordinary skill in the art that various changes in form and details may be made therein without departing from the spirit and scope of the present invention as defined by the following claims, and equivalents thereof.

What is claimed is:

1. A battery system comprising:
a rack having a plurality of battery tray positions, each of the battery tray positions being associated with position information;
a battery tray in a corresponding battery tray position among the battery tray positions, the battery tray having an identifier; and
a system management unit electrically coupled to the battery tray, and being configured to receive and store the position information and the identifier,
wherein the system management unit is configured to determine the corresponding battery tray position of the battery tray in accordance with the identifier and the position information,
further comprising:
a plurality of position information boards respectively corresponding to the plurality of battery tray positions, each of the position information boards being configured to provide the position information of a corresponding one of the battery tray positions.

2. The battery system of claim 1, further comprising one or more other battery trays,
wherein the battery tray and the other battery trays are respectively and electrically coupled to the plurality of position information boards, and
wherein each of the other battery trays has an identifier.

3. The battery system of claim 2, wherein the system management unit is configured to receive the identifier and position information corresponding to each of the battery trays via separate data lines respectively coupled between the battery trays and the system management unit.

4. The battery system of claim 3, wherein each of the battery trays is configured to receive the position information from a corresponding one of the position information boards, and to communicate the identifier and the received position information to the system management unit.

5. The battery system of claim 2, wherein the system management unit is configured to receive the identifier and the position information corresponding to each of the battery trays via separate data lines respectively coupled between the position information boards and the system management unit.

6. The battery system of claim 5, wherein each of the position information boards is configured to receive the identifier from a corresponding one of the battery trays, and to communicate the received identifier and the position information to the system management unit.

7. The battery system of claim 2, wherein the system management unit is configured to receive the identifier and the position information corresponding to each of the battery trays via a data line coupled between a corresponding one of the battery trays and the system management unit.

8. The battery system of claim 7, wherein the corresponding one of the battery trays is configured to receive the identifier and the position information from each of the other battery trays, and to communicate the received identifier and the received position information to the system management unit.

9. The battery system of claim 2,
wherein the battery trays are grouped into a first group and a second group, and
wherein the system management unit is configured to receive the identifier and the position information corresponding to each of the battery trays in the first group via a first data line coupled between a corresponding one of the battery trays in the first group and the system management unit, and is configured to receive the identifier and the position information corresponding to each of the battery trays in the second group via a second data line coupled between a corresponding one of the battery trays in the second group and the system management unit.

10. The battery system of claim 9,
wherein the corresponding one of the battery trays in the first group is configured to receive the identifier and the position information from each of the other battery trays in the first group, and to communicate the received identifier and the received position information to the system management unit, and
wherein the corresponding one of the battery trays in the second group is configured to receive the identifier and the position information from each of the other battery trays in the second group, and to communicate the received identifier and the received position information to the system management unit.

11. The battery system of claim 2, wherein the system management unit is configured to receive the identifier and the position information corresponding to each of the battery trays via a data line coupled between a corresponding one of the position information boards and the system management unit.

12. The battery system of claim 11, wherein the corresponding one of the position information boards is configured to receive the identifier and the position information from each of the other position information boards, and to communicate the received identifier and the received position information to the system management unit.

13. The battery system of claim 2,
wherein the position information boards are grouped into a first group and a second group, and
wherein the system management unit is configured to receive the identifier and the position information corresponding to each of the battery trays via a first data line coupled between a corresponding one of the position information boards in the first group and the system management unit, and is configured to receive the identifier and the position information corresponding to each of the battery trays via a second data line coupled between a corresponding one of the position information boards in the second group and the system management unit.

14. The battery system of claim 13,
wherein the corresponding one of the position information boards in the first group is configured to receive the identifier and the position information from each of the other position information boards in the first group, and to communicate the received identifier and the received position information to the system management unit, and
wherein the corresponding one of the position information boards in the second group is configured to receive the identifier and the position information from each of the other position information boards in the second group, and to communicate the received identifier and the received position information to the system management unit.

15. An energy storage system comprising:
a power conversion system configured to be coupled to a power generation system and a power grid; and
the battery system of claim 1 coupled to the power conversion system, the power conversion system comprising an integrated controller and being configured to supply power from the battery system, the power generation system, or the power grid to a load,
wherein the integrated controller is configured to receive the position information and the identifier from the system management unit, and to determine the corresponding battery tray position of the battery tray in accordance with the identifier and the position information.

16. A method of controlling a battery system comprising a rack that has a plurality of battery tray positions, the method comprising:

determining position information of a battery tray in one of the battery tray positions; and
communicating data to a system management unit, the data comprising the position information and an identifier stored at the battery tray;
storing the position information and the identifier at the system management unit; and
detecting the battery tray position where the battery tray is located from among the plurality of battery tray positions based on the position information and the identifier stored at the system management unit,
wherein the determining of the position information comprises generating the position information from a position information board associated with the one of the battery tray positions.

17. The method of claim 16, wherein the battery tray comprises a battery, and the method further comprising:
monitoring the battery;
transmitting a monitoring result of the battery to the system management unit;
determining whether or not the battery tray is defective based on the monitoring result; and
extracting the position information and the identifier of the battery tray from the data to determine the battery tray position of the battery tray determined to be defective.

18. A battery system comprising:
a battery management system (BMS); and
a plurality of sub-battery systems electrically coupled to the BMS,
each of the sub-battery systems being the battery system of claim 1,
wherein the BMS is configured to receive sets of data respectively from the sub-battery systems, and each of the sets of data comprises the identifier and the position information of the battery tray of a corresponding one of the sub-battery systems, and
wherein the BMS and/or the system management unit is configured to determine the corresponding battery tray position of the battery tray in accordance with the identifier and the position information.

19. The battery system of claim 18, wherein each of the sets of data further comprises rack information indicating a position of the rack of a corresponding one of the sub-battery systems.

* * * * *